D. HORSLEY.
AUTOMATIC LIGHT CONTROLLED FILM PRINTING APPARATUS.
APPLICATION FILED JUNE 5, 1915.
1,227,623.
Patented May 29, 1917.
5 SHEETS—SHEET 3.
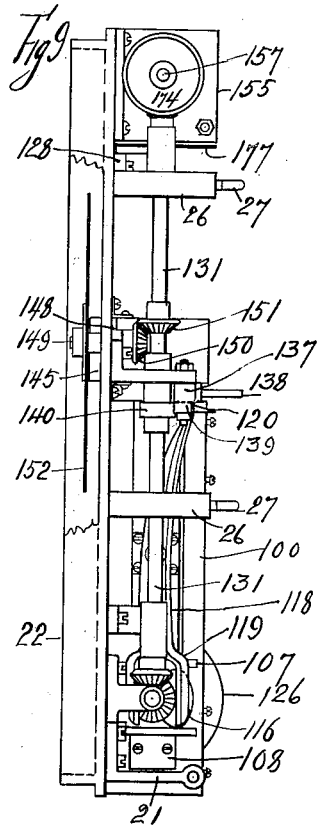
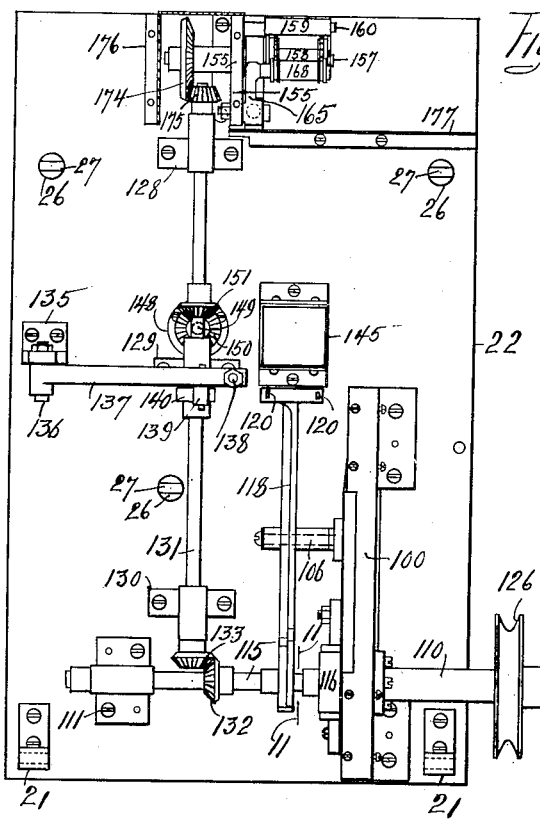
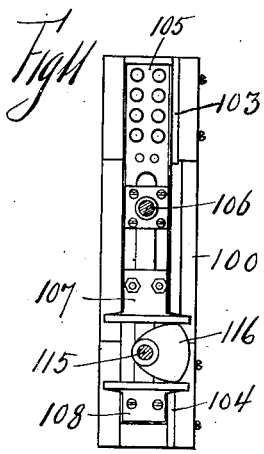
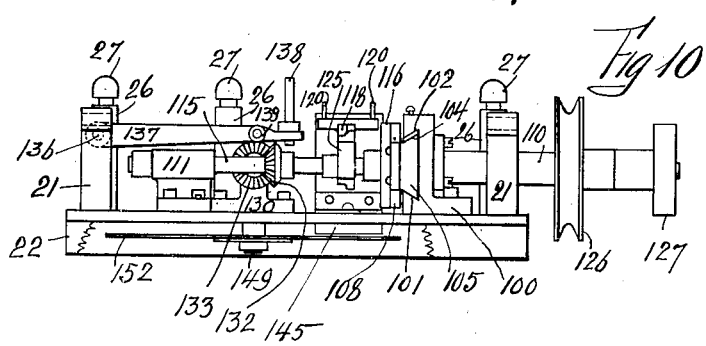
Witnesses:
C. A. Case
Albert M. Trodsky
Inventor
David Horsley
By his Attorney
A. A. de Bonneville

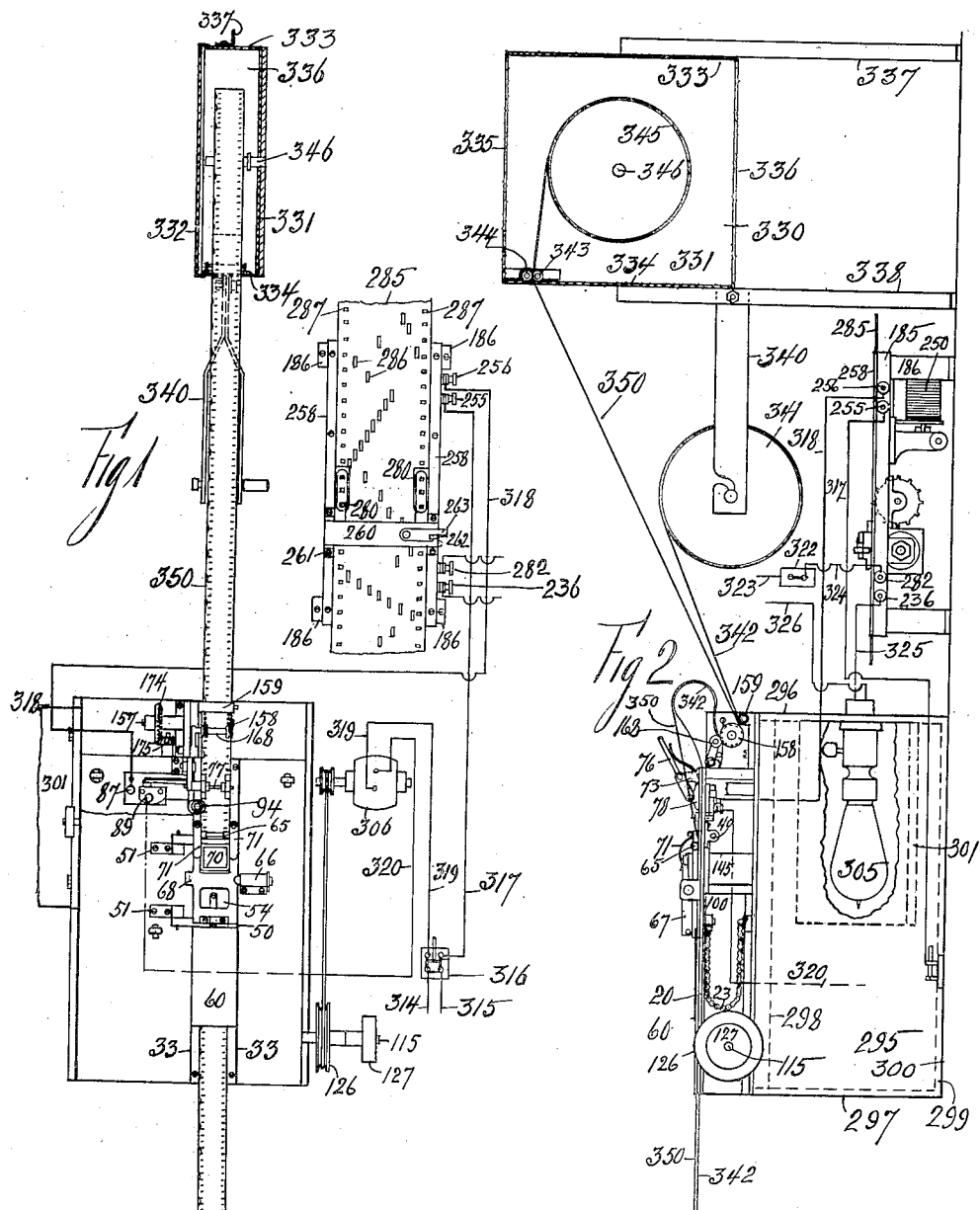

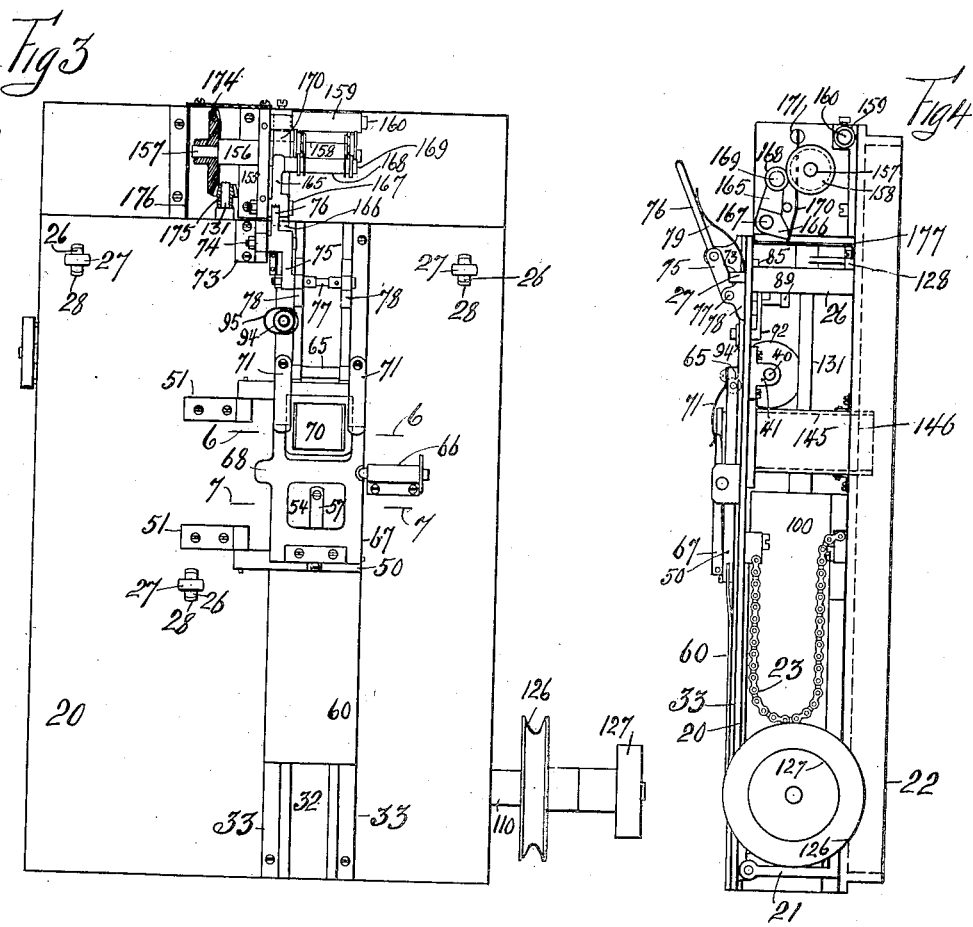

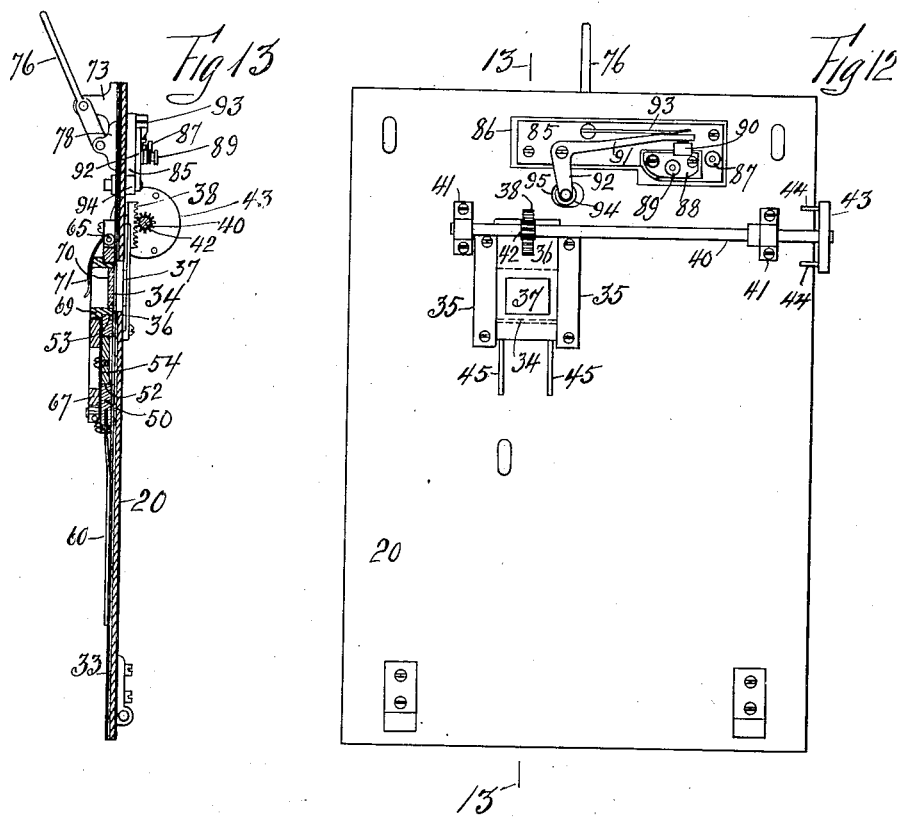

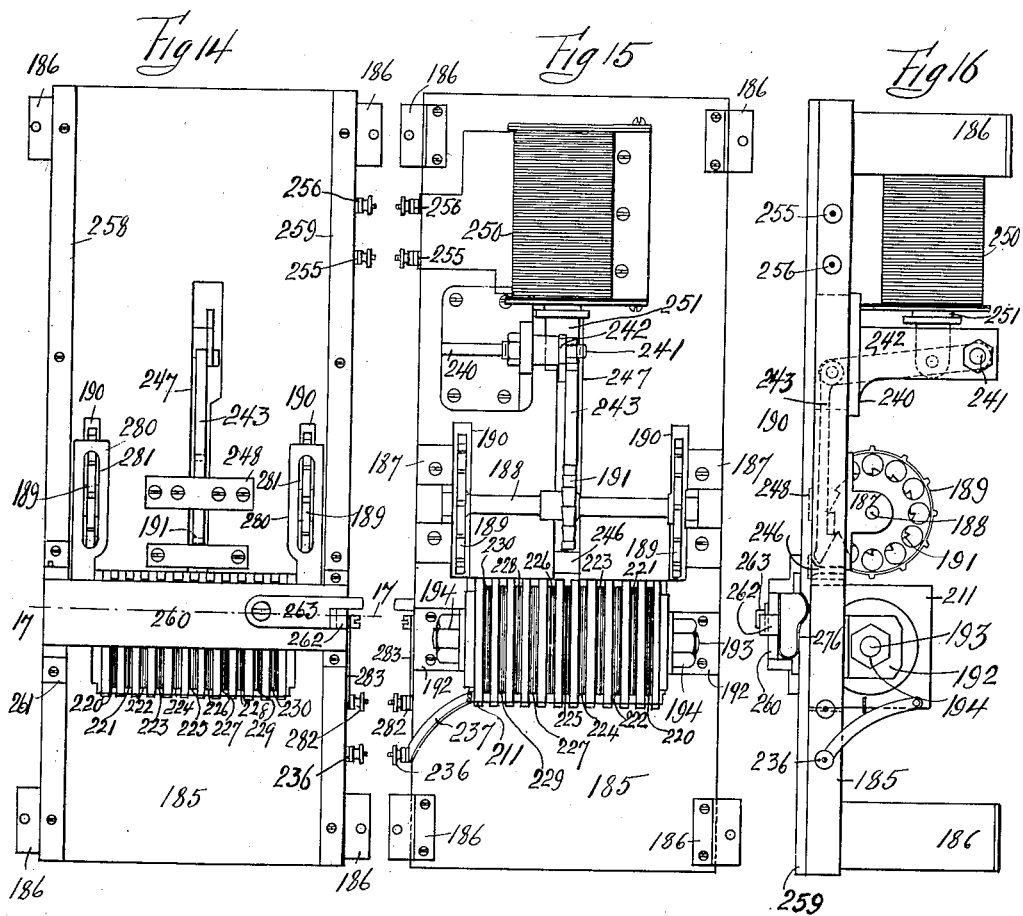
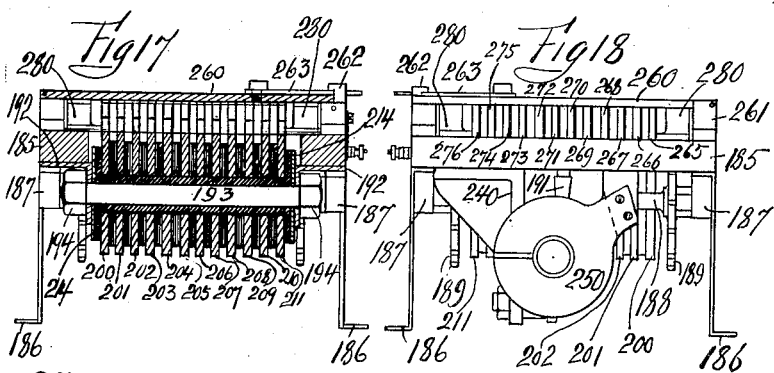

UNITED STATES PATENT OFFICE.

DAVID HORSLEY, OF BAYONNE, NEW JERSEY.

AUTOMATIC LIGHT-CONTROLLED FILM-PRINTING APPARATUS.

1,227,623.  Specification of Letters Patent.  Patented May 29, 1917.

Application filed June 5, 1915. Serial No. 32,429.

*To all whom it may concern:*

Be it known that I, DAVID HORSLEY, a citizen of the United States, and a resident of Bayonne, in the county of Hudson and State of New Jersey, have invented certain new and useful Improvements in Automatic Light-Controlled Film-Printing Apparatus, of which the following is a specification.

This invention relates to an automatic light controlled film printing apparatus. Its organization comprises means for making motion picture positive films from a previously exposed and developed negative. Its novelty relates chiefly to an automatic control of the printing light. In other printers of this class the control of the light is dependent upon the skill and judgment of the operator. The present invention provides an absolutely accurate and automatic control for the light of the printer by the introduction of a resistance coil, portions of which can be introduced or cut out of an electric circuit in series with the light of the apparatus by means of a solenoid. The operations of the latter are controlled by notches made in one of the edges of the negative film used in the apparatus. By means of the appurtenances of the invention more or less intensity of light is given by the lamp of the apparatus to the negative, when said negative and undeveloped film pass a light duct which is controlled by a shutter. With the invention the number of patches in a positive film are greatly reduced, as the printing of the different scenes on the positive is a continuous operation.

The appurtenances of the invention expose the succeeding portions of the unexposed positive film to varying intensities of light, and produce a uniform positive film from a negative of various photographic densities. The invention permits the assembling of a motion picture negative film in its entirety and by controlling the light, permits the development of the positive film print in one roll regardless of the number of scenes or the number of changes in the density of the negative scenes.

Figure 1 represents a front view of the invention, Fig. 2 shows a right hand side view of Fig. 1; Fig. 3 shows a front elevation of the film propelling device of the invention; Fig. 4 is a right hand side view of Fig. 3; Fig. 5 represents a top view of Fig. 3, Fig. 6 shows a partial section of Fig. 3 on the line 6, 6, Fig. 7 is a partial section of Fig. 3 on the line 7, 7, Fig. 8 shows an elevation of the film propelling device with the front plate thereof removed; Fig. 9 shows a left hand side view of Fig. 8 with a portion broken away; Fig. 10 is a bottom end view of Fig. 8 partly broken away; Fig. 11 represents a partial section of Fig. 8 on the line 11, 11; Fig. 12 shows a rear view of the front plate of the film propelling device; Fig. 13 shows a section of Fig. 12 on the line 13, 13, Fig. 14 is a front elevation of the light regulating device; Fig. 15 shows a rear view of Fig. 14; Fig. 16 represents a left hand side view of Fig. 15; Fig. 17 represents a section of Fig. 14 on the line 17, 17 and Fig. 18 shows a top plan view of Fig. 15.

The film propelling device comprises the front plate 20, which by means of the hinge brackets 21 is hinged to the base plate 22. A chain 23 has one end fastened to the front plate 20 and its other end is fastened to the base plate 22. Posts 26 extend from the base plate 22 and have in threaded engagement at their upper ends the clamping screws 27, which latter extend through the openings 28 in the plate 20. By means of the screws 27, the front plate 20 is held in operative position on the posts 26.

The front plate 20 has formed therewith a clearance depression 32, and guide rails 33 are secured to said plate adjacent to the opposite sides of said depression. An opening 34 is formed in the plate 20 between the guide rails 33. To the rear face of the front plate 20 on opposite sides of the opening 34 are secured a pair of guide bars 35. A slide 36 with an opening 37 is guided by the guide bars 35 and has extending therefrom a rack 38. An adjusting shaft 40 is journaled in journal brackets 41 that extend from the rear face of the front plate 20. A pinion 42 fastened to the adjusting shaft 40 meshes with the rack 38. A hand wheel 43 is fastened to one end of the shaft 40 and has extending therefrom the adjusting pins 44 that coact with the rear face of the front plate 20, and constitute stops for the ends of the stroke of the slide 36. Openings 45 are formed in the plate 20 for the film propelling hooks to be described.

A guide cover 50 is hinged to the front plate 20 by means of the hinge brackets 51, and it has formed therein the opening 52 and the opening 53. In the opening 52 is movably located the presser guide block 54, which latter has extending from its lower face the guide bars 55 with the longitudinal grooves 56. A spring 57 has one end fastened to the top face of the cover 50 and the other end thereof is fastened to the presser guide block 54. A guide apron 60 extends from the lower edge of the guide cover 50. A guide roller 65 is journaled in the upper end of the guide cover 50. A spring latch 66 on the front plate 20 maintains the guide cover 50 in its locked position.

A frame 67 with the lug 68 is hinged to the guide cover 50 and has formed therewith an opening for the frame 69 that carries the colored glass 70. Clamping springs 71 have one end of each fastened to the guide cover 50 and the other ends thereof bear both on the frames 67 and 69.

A bracket 73 extends from the front face of the front plate 20 and carries a pivot 74, on which is hinged a lever 75 with the handle 76. A pivot 77 is carried at the lower end of the lever 75 and has movably supported thereon the presser feet 78, for the films to be described. A spring 79 has one end fastened to the plate 20 and the other end thereof bears against the handle 76 to normally maintain the presser feet 78 in operative position. To the rear face of the plate 20 is fastened a switch plate 85, which latter is insulated from the plate 20 by means of the insulating material 86. A binding post 87 extends from the plate 85 and a bracket 88 with the binding post 89 and contact plug 90 is fastened to the switch plate 85. A switch crank with the legs 91 and 92 is pivoted to the plate 85. A spring 93 bears on the leg 91 to maintain it in contact with the plug 90. A roller 94 is journaled on the end of the leg 92 and extends through the opening 95 in the plate 20. The said roller contacts with the edge of the negative film which will be described, to actuate the leg 91 and cause the latter to separate from the contact plug 90.

To the base plate 22 is secured a guide bar 100 which has formed therein inclined faces 101 and 102. Adjusting guide plates 103 and 104 are adjustably clamped to the faces 102. A cross head 105 is slidably supported in the guide bar 100. A pivot 106 and guide brackets 107 108 are carried on the cross head 105. An elongated bearing 110 is bolted to the guide bar 100. A journal bracket 111 is fastened to the base plate 22. A driving shaft 115 is journaled in the bearing 110 and in the journal bracket 111. A cam 116 is fastened to the shaft 115 and contacts with the guide brackets 107 and 108. A film gripping hook lever 118 is supported on the pivot 106 and has formed therewith the forked end 119. Film gripping pins 120 are carried on said lever and extend through the openings 45 in the plate 20. A cam 125 is fastened to the driving shaft 115 and engages the fork end 119. A grooved pulley 126 and a hand wheel 127 are fastened to the driving shaft 115. Journal brackets 128, 129 and 130 extend from the base plate 22 and have journaled therein the longitudinal shaft 131. A bevel gear 132 on the shaft 115 meshes with the bevel gear 133 fastened to the shaft 131. A journal bracket 135 extends from the plate 22 and supports a pivot 136. A releasing lever 137 is hinged on the pivot 136 and has extending from its swinging end the releasing pin 138. A roller 139 is journaled on a pin extending from the releasing lever 137. A cam 140 on the shaft 131 contacts with the said roller 139. With the rotations of the shaft 131, the cam 140 causes the releasing lever 137 to swing and thereby the pin 138 bears against the lug 68 at the proper times to release the frame 69 with the colored glass 70 from the film to be described, at the proper times. A light duct 145 extends over an opening 146 which is formed in the base plate 22 and is in line with the colored glass 70. A journal bracket 148 is fastened to the base plate 22 and has journaled therein the pivot 149. A bevel gear 150 is fastened to the pivot 149 at one end and meshes with a bevel gear 151 that is fastened to the shaft 131. A shutter 152 is fastened to the other end of the pivot 149 and coacts with the opening through the duct 145.

A bracket 155 is fastened to the base plate 22 and has extending therefrom a journal bearing 156. A shaft 157 is journaled in the bearing 156 and carries the film sprocket wheel 158. A film guide roller 159 is journaled on a pin 160 extending from the bracket 155. A crank with the arms 165 and 166 is pivoted on a pivot 167 extending from the bracket 155. A guide roller 168 is journaled on a pin 169 extending from the arm 165. A spring 170 has one end fastened to a plug 171 extending from the bracket 155, while the other and free end of said spring bears against the arm 166, to maintain the guide roller 168 distant from the sprocket wheel 158 if desired. A bevel gear 174 is fastened on the shaft 157 and meshes with the bevel pinion 175 fastened to the shaft 131. Guard plates 176 and 177 extend from the base plate 22.

The light regulating device comprises a base board 185 of wood or other insulating material, which has extending therefrom the supporting legs 186. A pair of journal brackets 187 extend from the rear face of the base board 185 and have journaled therein the driving shaft 188. A pair of sprocket wheels 189 are fastened to the shaft 188 and extend through the openings 190 in the base board 185. A ratchet wheel 191 is fastened to the shaft 188. A pair of brackets 192 extend from the base board 185 and support a stud 193 with insulating material around the body thereof. Nuts 194 are supported at the ends of the stud. A plurality of contact plates 200 to 211 are supported on the insulating material of the studs, and washers 214 with plates of insulating material 215 are located between the end contact plates and the nuts 194. Resistance coils 220 to 230, which are in series, are located between the contact plates 200 to 211. One end of the wire of the coil 220 is fastened to the contact plate 200 and is then wound around the insulated stud 193, between said plate 200 and the next adjacent contact plate 201. The wire of the coil then passes through a slot in the contact plate 201 and is secured in said slot by a plug. The wire then is wound around the insulated stud 193 to form the second coil 221 between the contact plates 201 and 202. The wire is then wound in a similar manner to form the remaining resistance coils, the end of the last coil 230 being fastened to the last contact plate 211.

A binding post 236 extends from one side of the board 185 and a connecting strip 237 extends between said binding post 236 and the contact plate 211. A bracket 240 extends from the rear face of the base board 185 and has extending therefrom the pivot 241. A lever 242 has one end hinged on the pivot 241 and to the other end thereof is pivoted the ratchet lever 243. The latter coacts with the ratchet wheel 191. A guide 246 extends into an opening 247 in the base 185, to guide the ratchet lever 243 into contact with the ratchet wheel 191. The said opening 247 permits the said ratchet lever 243 and the sprocket wheel 191 to perform their functions. A guide plate 248 over the opening on the front face of the base board 185 maintains the ratchet lever 243 in proper position.

A solenoid 250 is fastened to the rear face of the base board 185 and its core 251 is pinned to the lever 242.

A pair of binding posts 255 and 256 are wired with the field of the solenoid.

To the front face of the base board 185 are fastened the guide bars 258 and 259. A brush bar 260 is hinged to a bracket 261 that extends from the guide bar 258. A latch hook 262 extends from the bar 259 and a latch 263 pivoted on the brush bar 260 engages the hook 262 to lock the bar 260 into position. Brushes 265 to 276 extend from the lower face of the brush bar 260 and are in line and can bear on the contact plates 200 to 211. Spring clamping guides 280 with the longitudinal openings 281 extend from the brush bar 260. The said openings 281 are in line with the sprocket wheels 189 when the brush bar 260 is in its closed position. A binding post 282 extends from the side of the base board 185 and a wire 283 connects the latter binding post with the latch hook 262.

An index card 285 with a plurality of perforations 286 on its face and perforations 287 on its edges is placed on the front face of the board 185. The index card is clamped in position on the board 185 by means of the brushes 265 to 277, and the spring clamping guides 280. The perforations 287 are engaged by the sprocket wheels 189 to propel the said index card and the perforations 286 when they come under the brushes 265 to 276 allow the latter to come into contact with the respective contact plates 200 to 211.

A lamp house is indicated in its entirety by the numeral 295 and comprises the top 296, bottom 297, front frame 298, rear wall 299, and side walls 300. A door 301 is hinged over an opening in one of the side walls 300. A lamp 305 is located in the lamp house 295 and is attached to the top 296. An electric motor 306 is belted to the pulley 126.

A pair of main line wires are indicated at 314 and 315 for a source of electric current and which are connected to switch 316. A wire 317 connects the said switch with the binding post 255. A wire 318 connects the binding post 256 and the binding post 87 of the switch plate 85. A wire 319 extends from the switch 316 to the motor 306. A wire 320 connects said electric motor 306 with the binding post 89. A switch is indicated at 322 and has leading thereto a main line wire 323. A wire 324 connects the switch 322 and the binding post 282. A wire 325 connects the binding post 236 with the socket of the lamp 305, and a main line wire 326 extends to said socket.

A film case is indicated in its entirety by the numeral 330. It comprises the side wall 331, door 332, top wall 333, bottom wall 334, front wall 335, and rear wall 336. It has extending therefrom the legs 337 and 338 by means of which it is secured in place. A forked leg 340 extends from the leg 338. The forked leg 340 has formed therein bearings for a reel 341, and the latter carries a negative film 342. A pair of guide rollers 343, 344 are journaled over an opening in the bottom wall 336. A reel 345 is carried on a pivot 346 in the said case, and carries the positive film 350. Both the films are then led over the guide roller 159, under the film sprocket wheel 158 and then over the guide roller 168. The film 342 then passes under the presser feet 78 and bears on the front plate 20. The film 350 after passing the roller 168 passes over the feet 78 and then both films pass under the roller 65 and the colored glass 70. The films are then engaged by the film gripping pins 120 and are finally discharged from under the apron 60.

To operate the invention the operator assembles the negative film 342 with the different scenes thereof in their proper sequence. The said negative film has been previously notched on one of its side edges as indicated at 352, for the purpose of permitting the roller 94 to engage the same and thereby permit the leg 91 of the switch crank to make contact with the contact plug 90. This will close the electric circuit of the solenoid 250. The core 251 is thereby drawn up which causes the ratchet wheels 191 to turn through an angle of one tooth, thereby turning the driving shaft 188 and the sprocket wheels 189. This causes the index card 285 to rise the proper distance to separate one of the brushes 265 to 277 from its corresponding contact plate, all of which latter are indicated by the numerals 200 to 211. This will cause one of the other brushes to make contact with its corresponding contact plate, thereby reducing or increasing the amount of the resistance of the coils 220 to 232, which are in the electric circuit of the lamp 305. The greater the resistance the less intensity of the light produced by said lamp.

The film printing apparatus is operated by power being transmitted to the grooved pulley 126, and which pulls the negative film 342 from the reel 341 and the raw material from the reel 345. The light from the lamp 305 passes through the light duct 145 and through the negative film 342, and thereby prints the positive. Both films are simultaneously moved down during the period that the solid portion of the shutter 152 is passing between the light and the said light duct 145. When a change of scene occurs in the negative requiring less or more light to give a proper print from the negative, the roller 94 drops into one of the notches 352 at the beginning of the next scene, permitting electric contact to be made by leg 91 and contact plug 90. This permits a flow of electricity through the solenoid which through the intervening mechanism causes the index card 285 to move up, in this instance, and brings into contact the proper brush to make the proper contact between it and the contact plate to give the desired intensity of light, by varying the quantity of resistance in the light circuit.

Having described my invention what I desire to secure by Letters Patent and claim is:

1. In an apparatus of the character described the combination of a movable notched film, a source of light, an electric resistance coil in the apparatus in electric circuit with the source of light, an index card coacting with said coil to vary the amount of resistance in said coil, means coacting with the notches of the film to move said card, to vary the resistance of said coil and thereby vary the intensity of the source of light.

2. In an apparatus of the character described the combination of a notched film, means to move said film, an electric lamp in the apparatus, an electric switch for the lamp controlled by the notches of said film, a light regulating device in the apparatus, a solenoid connected to the latter device and in electric circuit with said switch, an index card having perforations across its face, gripping fingers in the apparatus for the index card, connections between the solenoid and said gripping fingers to move said card, electric resistance coils in the apparatus, contact plates for said coils, a brush for each of said plates, the electric circuit of the apparatus connecting the lamp, said coils and brushes, the said index card interposed between said brushes and plates, the openings in the card closing the electric circuit between the brushes and contact plates when under the former, thereby regulating the number of coils in the electric circuit and controlling the intensity of the electric lamp.

3. In an apparatus of the character described the combination of an index card having perforations in the face thereof and perforations adjacent to the edges thereof, sprocket wheels journaled in the apparatus, a solenoid, connections between the solenoid and said sprocket wheels to cause the latter to engage the perforations adjacent to the edges of the index card and thereby move the latter, resistance coils in the apparatus, contact plates in electric circuit with said coils, brushes for the contact plates, the index card interposed between the brushes and the contact plates, the holes in the face of the index cards permitting contact between said brushes and contact plates when under said brushes, a lamp in electric circuit with said plates and brushes to vary the intensity of said lamp with various of said coils in the electric circuit, a switch in circuit with said solenoid, and a notched moving film controlling said switch.

4. In an apparatus of the character described the combination of a lamp house, an electric lamp for the lamp house, a movable film with notches in one of the edges thereof for the lamp house, an electric switch in the apparatus controlled by the notches of said film, a light regulating device for an index card having perforations across its face, a solenoid for said device, means actuated by the solenoid to move said card, an electric circuit between the switch and solenoid to operate the latter, resistance coils and brushes in electric circuit with the lamp, the perforations in the index card controlling the number of resistance coils and thereby regulating the intensity of the light of the electric lamp.

5. In an apparatus of the character described the combination of an electric lamp, a movable notched film for the apparatus, a switch crank having a pair of legs pivoted in the apparatus, a contact plug coacting with one of said legs, a roller journaled in the other leg coacting with the notches in the film, a solenoid for the apparatus, an electric circuit between said solenoid and switch, the latter normally maintained open by the edge of the film and closed by the coaction of said roller and said notches, a light controlling device, an index card having perforations across its face, means coacting with the solenoid to move said card, resistance coils in the light controlling device controlled by the perforations in said card and an electric circuit between said coils and said lamp to regulate the intensity of the light of the latter.

Signed at Bayonne, in the county of Hudson and State of New Jersey this 19th day of May A. D. 1915.

DAVID HORSLEY.

Witnesses:
A. A. DE BONNEVILLE,
GEO. J. LOUNSBURY.